(12) United States Patent
Akkarakaran et al.

(10) Patent No.: US 10,686,564 B2
(45) Date of Patent: Jun. 16, 2020

(54) PRE-TIMED AND ON-DEMAND HARQ ACK FEEDBACK

(71) Applicant: QUALCOMM Incorporated, San Diego, CA (US)

(72) Inventors: Sony Akkarakaran, Poway, CA (US); Tao Luo, San Diego, CA (US); Arumugam Chendamarai Kannan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 15/922,201

(22) Filed: Mar. 15, 2018

(65) Prior Publication Data

US 2018/0302193 A1 Oct. 18, 2018

Related U.S. Application Data

(60) Provisional application No. 62/486,864, filed on Apr. 18, 2017.

(51) Int. Cl.
*H04L 1/18* (2006.01)
*H04L 5/00* (2006.01)
(Continued)

(52) U.S. Cl.
CPC .......... *H04L 1/1825* (2013.01); *H04L 1/1812* (2013.01); *H04L 1/1854* (2013.01);
(Continued)

(58) Field of Classification Search
CPC ... H04L 1/1614; H04L 1/1812; H04L 1/1825; H04L 1/1854; H04L 1/1864; H04L 1/1887; H04L 5/0055; H04W 72/0446
See application file for complete search history.

(56) References Cited

U.S. PATENT DOCUMENTS

| | | | |
|---|---|---|---|
| 2008/0205348 A1* | 8/2008 | Malladi | H04L 1/1607 370/335 |
| 2011/0081932 A1* | 4/2011 | Astely | H04L 5/001 455/509 |

(Continued)

FOREIGN PATENT DOCUMENTS

WO WO-2016/182405 A1 11/2016
WO WO-2017/095289 A1 6/2017

OTHER PUBLICATIONS

Huawei et al., "Discussion on Synchronous and Asynchronous HARQ Method for eLAA", 3GPP DRAFT; R1-167190, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016, XP051125765, Retrieved from the Internet: URL:http://www.3gpp.org/ftp/Meetings_3GPP_SYNC/RAN1/Docs/ [retrieved on Aug. 21, 2016], 3 pages.

(Continued)

*Primary Examiner* — Kashif Siddiqui
(74) *Attorney, Agent, or Firm* — Arent Fox, LLP

(57) ABSTRACT

Described are methods, apparatuses, and computer-readable mediums of enabling transmission of feedback for a mixture of pre-timed and on-demand acknowledgements. In an example, an apparatus receives a first transmission and a second transmission. The apparatus determines that the first transmission is associated with pre-timed acknowledgement rules and also determines that the second transmission is associated with on-demand acknowledgement rules. The apparatus transmits a first acknowledgement of the first transmission according to the pre-timed acknowledgement rules and transmits a second acknowledgement of the second transmission according to the on-demand acknowledgement rules.

20 Claims, 8 Drawing Sheets

(51) Int. Cl.
*H04W 72/04* (2009.01)
*H04L 1/16* (2006.01)

(52) U.S. Cl.
CPC .......... *H04L 1/1864* (2013.01); *H04L 1/1887* (2013.01); *H04L 5/0055* (2013.01); *H04W 72/0446* (2013.01); *H04L 1/1614* (2013.01)

(56) References Cited

U.S. PATENT DOCUMENTS

| | | | | |
|---|---|---|---|---|
| 2011/0243066 | A1* | 10/2011 | Nayeb Nazar | H04L 1/007 370/328 |
| 2011/0267995 | A1* | 11/2011 | Li | H04L 1/1614 370/280 |
| 2012/0039275 | A1* | 2/2012 | Chen | H04L 1/1607 370/329 |
| 2012/0044871 | A1* | 2/2012 | Li | H04L 1/1854 370/328 |
| 2016/0020873 | A1 | 1/2016 | Park et al. | |
| 2016/0198352 | A1 | 7/2016 | Jarrahi et al. | |
| 2017/0207895 | A1 | 7/2017 | Yang et al. | |

OTHER PUBLICATIONS

Partial International Search Report—PCT/US2018/022903—ISA/EPO—dated Jun. 18, 2018.

LG Electronics Inc., "HARQ RTT Timer with Reduced Processing Time", 3GPP DRAFT; R2-1701545 HARQ RTT Timer with Reduced Processing Time, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017 Feb. 12, 2017, XP051212169, Retrieved from the Internet: URL:http://www.3gpp.org/ftp/Meetings_3GPP_SYNC/RAN2/Docs/ [retrieved on Feb. 12, 2017], 2 pages.

International Search Report and Written Opinion—PCT/US2018/022903—ISA/EPO—dated Aug. 13, 2018.

\* cited by examiner

PRE-TIMED AND ON-DEMAND HARQ ACK FEEDBACK

CROSS-REFERENCE TO RELATED APPLICATION(S)

This application claims the benefit of U.S. Provisional Application Ser. No. 62/486,864, entitled "PRE-TIMED AND ON-DEMAND HARQ ACK FEEDBACK" and filed on Apr. 18, 2017, which is expressly incorporated by reference herein in its entirety.

BACKGROUND

Aspects of the present disclosure relate generally to wireless communication networks, and more particularly, to transmitting feedback for a mixture of pre-timed and on-demand acknowledgements.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current solutions for providing acknowledgement of receiving a transmission may not provide a desired level of customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes methods, apparatuses, and computer-readable mediums for wireless communications. The method includes receiving a first transmission and a second transmission, determining the first transmission is associated with pre-timed acknowledgement rules, determining the second transmission is associated with on-demand acknowledgement rules, transmitting a first acknowledgement of the first transmission according to the pre-timed acknowledgement rules, and transmitting a second acknowledgement of the second transmission according to the on-demand acknowledgement rules.

In this aspect, the pre-timed acknowledgement rules and the on-demand acknowledgement rules may be each pre-specified by specification rules or pre-configured semi-statically by radio resource control signaling.

In some cases, the pre-timed acknowledgement rules and the on-demand acknowledgement rules each include a bundling condition that allow bundling of a pre-timed acknowledgement transmission with an on-demand acknowledgement transmission. In some examples, the bundling condition is whether a timing of the pre-timed acknowledgement transmission and the on-demand acknowledgement transmission are within a transmission time interval range. This aspect of the method may further include determining whether a first set of resources for the pre-timed acknowledgement rules and a second set of resources for the on-demand acknowledgement rules are within a transmission time interval range, bundling a first acknowledgement of the first transmission and a second acknowledgement of the second transmission into a single transmission in response to the first set of resources for the pre-timed acknowledgement rules and the second set of resources for the on-demand acknowledgement rules being within the transmission time interval range, and the transmitting of the first acknowledgement and the second acknowledgement may include the single transmission including the first acknowledgement of the first transmission and the second acknowledgement of the second transmission.

Also, in this aspect of the method, the transmitting of the first acknowledgement or transmitting the second acknowledgement further comprises transmitting in a block acknowledgement.

In another aspect, a method of wireless communication includes receiving a current transmission including an acknowledgement type indicator that identifies transmitting a corresponding acknowledgement as being associated with either pre-timed acknowledgement rules or on-demand acknowledgement rules, determining whether the acknowledgement type indicator identifies the acknowledgement as being associated with the pre-timed acknowledgement rules or the on-demand acknowledgement rules, and transmitting the acknowledgement of receipt of a corresponding transmission according to the pre-timed acknowledgement rules or the on-demand acknowledgement rules based on the acknowledgement type indicator.

In this aspect, the corresponding transmission comprises the current transmission, a previously received transmission, or a subsequently received transmission. Alternative, the current transmission may comprise a control signal.

Also, in this aspect, transmitting the acknowledgement may further comprise transmitting in a block acknowledgement.

Additionally, in this aspect, when the acknowledgement is determined to be on-demand acknowledgement (e.g., determining whether the acknowledgement type indicator identifies the acknowledgement as being associated with the pre-timed acknowledgement rules or the on-demand acknowledgement rules determines the acknowledgement to be associated with the on-demand acknowledgement rules), the method may further include receiving a first subsequent transmission after the current transmission, wherein the first subsequent transmission is the corresponding transmission, receiving a second subsequent transmission after the first subsequent transmission, wherein the second subsequent transmission includes an acknowledgement demand indicator, and wherein transmitting the acknowledgement of receipt of the corresponding transmission is in response to receiving the acknowledgement demand indicator.

Moreover, the present disclosure also includes apparatus having components or configured to execute or means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
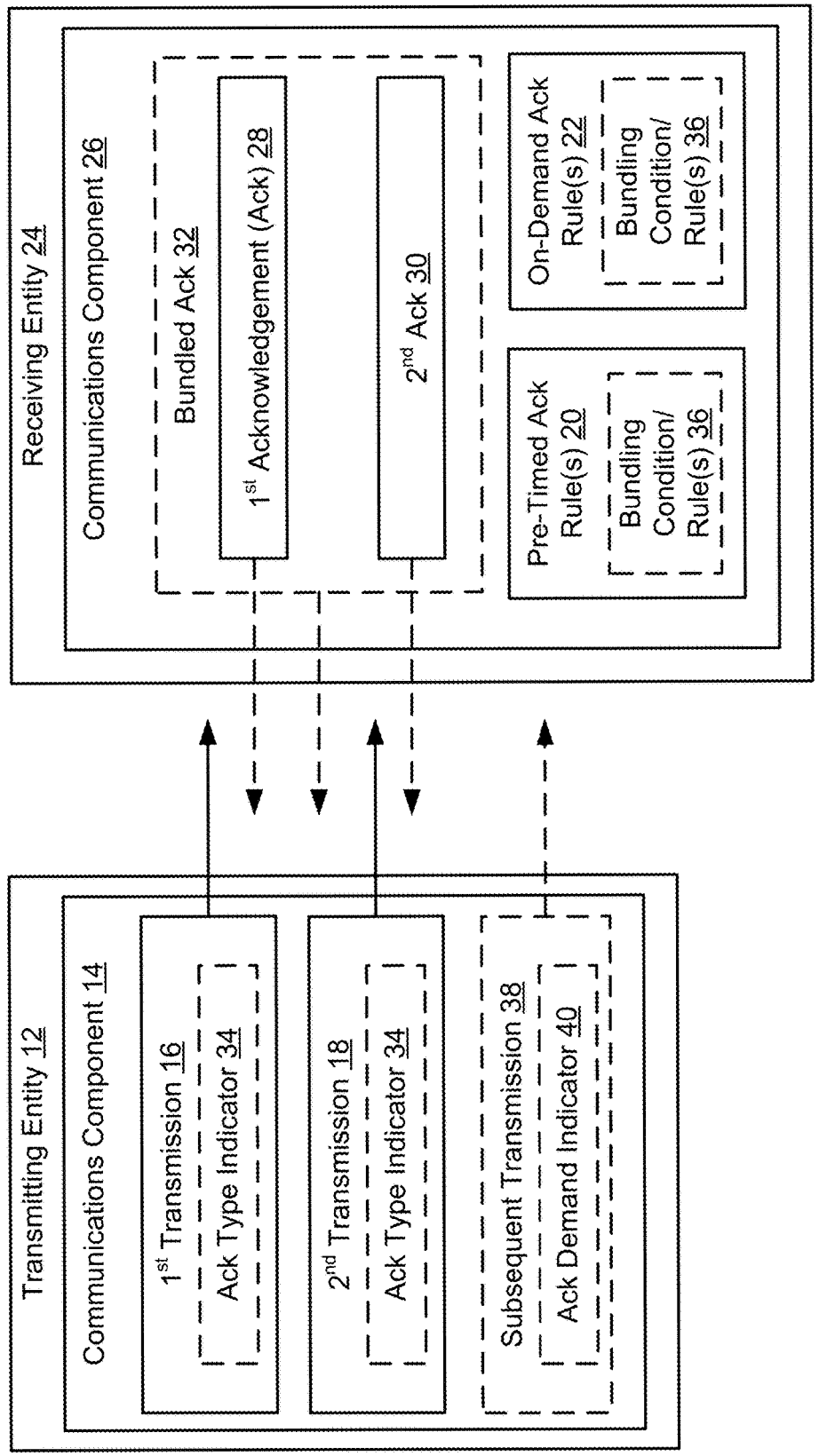
FIG. 1 is a schematic diagram of a wireless communication network including a transmitting entity and a receiving entity configured according to this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to apparatus and methods of transmitting feedback for a mixture of pre-timed and on-demand acknowledgements (ACKs or Acks) in response to a received transmission in a wireless communication system. It should be understood that acknowledgements discussed herein may generally refer to some type of response to a transmission and may include a positive acknowledgement (sometimes referred to as an Ack) a negative acknowledgement (also known as a Nack), or other types of responses as discussed in further detail below. It should also be understood that the acknowledgements discussed herein may refer to Acks transmitted on the uplink (UL) to acknowledge downlink (DL) transmission and/or Acks transmitted on the DL to acknowledge UL transmissions (even though some examples may focus on the DL or UL). Further, they could acknowledge data transmissions, e.g., as Acks for hybrid automatic repeat/request (HARQ), or could also acknowledge control transmissions, e.g., acknowledge critical control transmissions such as orders to change the transmit or receive beam or user equipment (UE) bandwidth.

As used herein, a "pre-timed" acknowledgement (ACK or Ack) is an Ack sent at a pre-determined time-delay following a receipt of a transmission, e.g., a packet, being acknowledged. The timing of a pre-timed Ack may be fixed in a specification, e.g., a 3rd Generation Partnership Project (3GPP) specification, or determined semi-statically by radio resource control (RRC) configuration, or determined dynamically as part of a grant scheduling the transmission being acknowledged.

As used herein, an "on-demand" Ack is one where the Ack timing is determined only after the reception of the grant scheduling the transmission. For example, a subsequent control transmission may explicitly request for the Ack to be sent. In another case, for instance, a subsequent control transmission may assign a specific type of control channel resource on a wireless link on which the Ack has to be sent. In this case, the type of control channel resource indicates that an Ack must be sent on it, where the type could include at least one of a slot/frame type of the resource, a time or frequency span of the resource, a waveform, a numerology, a transmit diversity scheme scheduled for the resource, and/or a power control or power level for the resource. An on-demand Ack may be used to increase scheduler flexibility. For example, flexibility may be improved by packaging specific Acks into a single control transmission, and/or deferring the scheduling of the Ack transmissions when needed. Also, on-demand Acks may be used in shared-spectrum scenarios where the transmission medium cannot be reserved for Ack transmission ahead of time, for instance, due to the need to first contend for access to the transmission medium.

According to the present aspects, apparatus and methods of wireless communication may enable a receiving entity to transmit a mixture of pre-timed and on-demand Acks in response to received transmissions either based on a fixed partitioning of the different Ack types (e.g., pre-timed or on-demand), or based on a dynamic determination of the Ack type.

In the first case of fixed partitioning of the different Ack types, different types of transmissions that require Acks may be associated with a respective one of the different Ack types. For example, but not to be construed as limiting, transmissions over a shared spectrum, where contention for the transmission medium may not allow precise control over transmission timing, may be associated with an on-demand Ack type, while control signaling transmissions that require Acks to be transmitted on a carrier that is not a shared-spectrum carrier may be associated with a pre-timed Ack type. For the fixed partitioning of different Ack types, each of the Ack types may have an independent set of rules that define the corresponding Ack procedure. For example, there may be a set of pre-timed Ack rules, and an independent set of on-demand Ack rules. Further, the different Ack types and/or corresponding independent sets of Ack rules may further include independent resource allocations (e.g., of transmit resource blocks) over which the respective Ack type may be transmitted. Also, in some implementations, the independent set of Ack rules of each Ack type may have a common condition, or a common set of rules, referred to as a bundling condition or bundling rules, that allow different Ack types to be transmitted together in a single transmission. It should be understood that bundling discussed herein may refer to combining two or more Acks into a single Ack or sending two or more separate Acks on the same transmission (which is also known as Ack multiplexing).

In the second case of dynamic determination of the Ack type, a received transmission may include an Ack type indicator that identifies the Ack type to be used. For example, the Ack type indicator may be an explicit indicator, for example with a variable value, where one value indicates to use a pre-timed Ack type and another value indicates to use an on-demand Ack type. Further, in some implementations, the Ack type indicator may have another value, or may include an additional element, such as a flag, that triggers a pre-timed Ack to also be repeated at a later time as an on-demand Ack, thus allowing a scheme for dynamic Ack repetition to avoid loss of Acks in challenging radio conditions. Moreover, in some cases, the Ack type indicator may be implicit, such as being indicated based on a time and frequency resource (e.g., an indexed resource block) carrying the received transmission. Additionally, in some cases, the Ack type indicator may be included in an initial transmission, such as in control signaling (e.g., in a grant), thereby identifying a corresponding transmission as having an on-demand Ack type. In this case, the timing of when to transmit the on-demand Ack may not be known, as the on-demand Ack may, in some examples, be triggered by a subsequent transmission (e.g., a subsequent control signal) that includes an Ack demand indicator. In this case, the Ack demand indicator may identify to the receiving entity to transmit a specific on-demand Ack, or all pending on-demand Acks.

In some implementations, a plurality of Acks of a given Ack type may be transmitted in a single transmission. For example, the single transmission may include a plurality of Acks, such as but not limited to a plurality of Acks in a field that may be referred to as a block-Ack. In one implementation that should not be construed as limiting, a block-Ack may include a field of a plurality of values corresponding to a plurality of transmissions, where the values may include or represent an Ack, a negative-Ack (Nack), or a null value for the corresponding transmission. There may be a block-Ack specifically for pre-timed Ack types, a block-Ack specifically for on-demand Ack types, or a combination of both. Moreover, in some cases, the independent sets of pre-timed Ack rules and/or on-demand Ack rules may specify how the Ack values in a block-Ack are handled in situations where an Ack for a respective one of the transmissions has changed from one Ack type to another Ack type.

Thus, the present apparatus and methods of wireless communication may enable more efficient wireless communications by allowing a receiving entity to transmit a mixture of pre-timed and on-demand Acks in response to received transmissions either based on a fixed partitioning of the different Ack types (e.g., pre-timed or on-demand), or based on a dynamic determination of the Ack type.

Referring to FIG. 1, for example, an example wireless communication network 100 may include a transmitting entity 12 having a communications component 14 configured to wirelessly transmit a plurality of transmissions, e.g., first transmission 16 and second transmission 18, that may be associated with either pre-timed Ack rules 20 or on-demand Ack rules 22. A receiving entity 24 includes a communication component 26 configured to receive the plurality of transmissions, e.g., first transmission 16 and second transmission 18, and determine an Ack type, e.g., a pre-timed Ack type or an on-demand Ack type, associated with each transmission to use for transmitting a corresponding Ack. For example, the corresponding Ack may include a first Ack 28 corresponding to first transmission 16, a second Ack 30 corresponding to second transmission 18, or in some cases a bundled Ack 32 that includes both first Ack 28 and second Ack 30. In the case of the bundled Ack 32, first Ack 28 and second Ack 30 may be combined into a single Ack and transmitted on a single transmission or may be two separate Acks transmitted on a single transmission. Further, for example, the corresponding Ack is transmitted according to either pre-timed Ack rules 20 or on-demand Ack rules 22 based on the corresponding Ack type of the received transmission. In some cases, transmitting entity 12 may be a 5G Node B (gNB) and receiving entity 24 may be a UE, while in other cases transmitting entity 12 may be a UE and receiving entity 24 may be a gNB. Thus, the apparatus and methods of transmitting a mixture of pre-timed and on-demand Acks described herein may related to Acks of DL transmissions or to Acks of UL transmissions.

Communications component 26 of receiving entity 24 may determine the Ack type of each corresponding Ack for each received transmission based on a fixed partitioning of Ack types for different transmissions, or based on dynamic determination of Ack type. For example, the fixed partitioning of Ack types for different transmissions may be included in or associated with pre-timed Ack rules 20 and/or on-demand Ack rules 22. Also, for example, the dynamic determination of Ack type may be in response to an Ack type indicator 34 that may be included in each of first transmission 16 or second transmission 18, where the Ack type indicator 34 identifies the corresponding Ack type to use. Additionally, in some cases, the use of bundled Ack 32 may be based on a bundling condition and/or rules 36 that are common to (or that are independent of and override) both pre-timed Ack rules 20 and on-demand Ack rules 22.

Moreover, in the case of the on-demand Ack type, a subsequent transmission 38 that includes an Ack demand indicator 40 may be received by receiving entity 24, and in response, communications component 26 of receiving entity 24, may transmit the corresponding on-demand Ack, e.g., which could be first Ack 28 and/or second Ack 30. For example, in this case, the transmission to be acknowledged, e.g., first transmission 16 or second transmission 18, may be identified in a prior transmission, such as a control signal (e.g., a grant). The transmission to be acknowledged may be known to be associated with a certain Ack type based on fixed partitioning based on the type of transmission, or based on Ack type indicator 34 in the prior transmission. As such, subsequent transmission 38 may be a subsequent control signal that includes Ack demand indicator 40.

Additionally, it should be noted that the transmitted Ack, e.g., first Ack 28 and/or second Ack 30, may be transmitted by the receiving entity 24 in response to one or more levels of transmissions. For example, there may be an Ack of a control signal in response to receipt of the control signal transmission. Further, for example, there may be an Ack in response to receipt of a data signal based on a grant that identifies resources for receiving the data signal and further in response to receiving the data signal transmission on the granted resources. Also, for example, there may be an Ack in response to receipt of a control signal having Ack demand indicator 40, where the Ack acknowledges receipt of a data signal based on a grant that identifies resources for receiving the data signal and further based on receiving the data signal transmission on the granted resources.

Thus, the present apparatus and methods of wireless communication may enable more efficient wireless communications by allowing receiving entity 24 to transmit a mixture of pre-timed and on-demand Acks, e.g., first Ack 28 and second Ack 30, in response to received transmissions, e.g., first transmission 16 and second transmission 18, either based on a fixed partitioning of the different Ack types (e.g., pre-timed or on-demand), or based on a dynamic determination of the Ack types.

Figure 2:
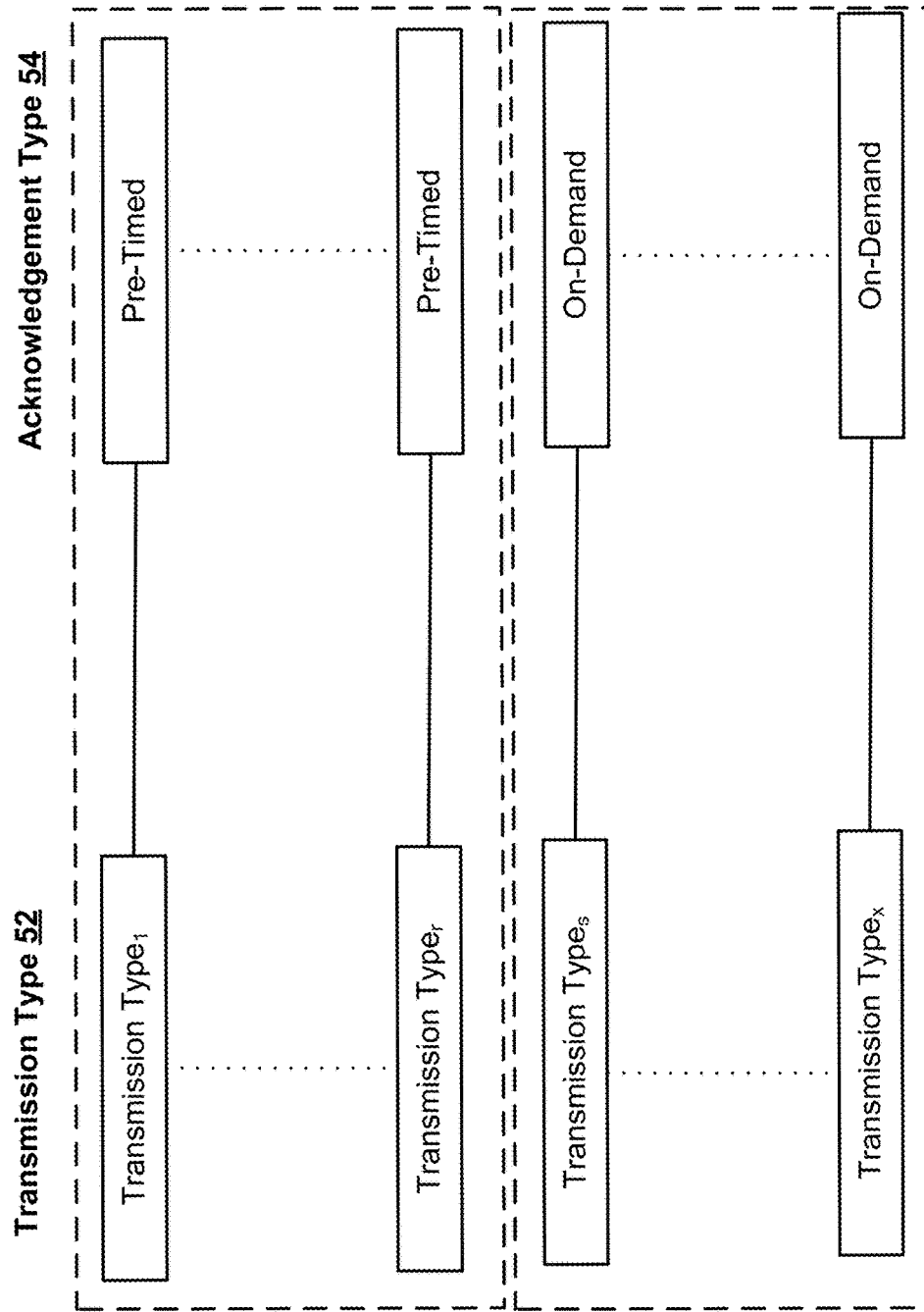
FIG. 2 is a schematic diagram of an example of fixed partitioning of acknowledgement (Ack) types.

Referring to FIG. 2, in the first case of fixed partitioning of the different Ack types, an example of fixed partitioning table 50 includes different transmission types 52 having a defined association with one of the different Ack types 54. For example, transmission types 1 to r are associated with pre-timed Ack types, while transmission types s to x are associated with on-demand Ack types. In this case, 1 to r and s to x may be any respective number of transmission types.

For example, Acks may have to be sent for a plurality of different types of received transmissions, e.g., transmission types 52, including data transmissions and control signaling transmissions. For example, Acks may be sent for one or more of multiple codeblocks, codeblock groups of multiple transport blocks, on multiple multiple input multiple output (MIMO) layers, on multiple HARQ processes, multiple Radio Network Temporary Identifiers (RNTIs), and on multiple component carriers. Also, for example, Acks may be sent for control information (such as Physical DL Control Channel (PDCCH) orders on DL, or special control signaling on UL such as transmission of a Sounding Reference Signal (SRS) or a scheduling request (SR)).

Accordingly, in this case, Acks for certain transmission types 52 may be mapped to certain Ack types 54. For instance, some transmissions may generally use a pre-timed Ack, while Acks for other transmissions may generally use an on-demand Ack. For example, as shown by FIG. 2, transmission types 1 to r use pre-timed Acks, while transmission types s to x use on-demand Acks, where r, s, and x are integers. In an implementation, the mapping of transmission type 52 to Ack type 54 may be either pre-specified by specification rules (e.g., 3GPP specifications), or pre-configured semi-statically by RRC signaling. In one example, which should not be construed as limiting, a UE or gNB may semi-statically identify heavily loaded carriers and configure all data carried on them for on-demand Acks, and/or configure all Acks sent on them to be on-demand Acks. In another example, which should not be construed as limiting, all Acks to be transmitted on shared-spectrum carriers may be designated to be on-demand Acks. Further, for example but not to be construed as limiting, in a carrier aggregation (CA) scenario with both licensed (i.e., dedicated) and shared-spectrum carriers, which Acks are transmitted on shared-spectrum carriers may be semi-statically configured. Additionally, for example but not to be construed as limiting, all Acks for control information may be designated to be pre-timed Acks (e.g., provided such Acks can be sent on carriers that are not shared-spectrum carriers). Moreover, in another example that should not be construed as limiting, Acks for certain HARQ processes may be designated to be pre-timed Acks, and others are on-demand Acks.

Further, and additionally referring back to FIG. 1, in the first case of fixed partitioning of the different Ack types 54, pre-timed and on-demand Acks may follow their own independent rules, e.g., pre-timed Ack rules 20 and on-demand Ack rules 22, and may have their own independent resource allocations for Ack transmissions. While the rules may be independent, they may each include one or more conditions that allow for shared, common, or combined resource allocations. For example, each set of rules may include bundling condition and/or rules 36 that allows both types of Acks to be bundled into a single transmission, e.g., bundled Ack 32. In some examples, bundling condition and/or rules 36 may allow both types of Acks to be combined into a single Ack and transmitted on a single transmission or may be two separate Acks transmitted on a single transmission, as described below. In one implementation, which should not be construed as limiting, the bundling condition and/or rule 36 may be met if these rules require both pre-timed and on-demand Acks to be sent within a pre-agreed time duration range, e.g., in identical, overlapping, or near-in-time transmission time intervals (TTIs).

Moreover, the independent pre-timed Ack rules 20 and the independent on-demand Ack rules 22, or a separate set of rules associated with bundling condition and/or rule 36, may define how to send the single, bundled Ack 32. For instance, but not to be construed as limiting, the single, bundled Ack 32 including both pre-timed and on-demand Acks may be sent on only a selected one of the resource allocations, or repeated on both resource allocations, or sent over a combined resource allocation (e.g., bundle both resource allocations into a single larger allocation). For example, regarding sending over one of the resource allocations, the rules may be configured to enable sending over the on-demand resource allocation since it is the later of the two allocations and thus would provide an entity, e.g., receiving entity 24, receiving the Ack time to change the resources used, if necessary.

Communications component 26 of receiving entity 24 may determine how to send the single, bundled Ack 32 based on a configured or selectable choice between the above options depending on one or more of: the characteristics of the resource allocations for the Acks, such as size, frequency location, waveform, numerology, transmit diversity scheme; the time difference between the allocations of the Acks (e.g., which one is earlier in time); the types and sizes of other control information to be included with these Acks, such as but not limited to other UL control information (UCI) such as SR or channel state information (CSI) on Physical UL Shared Channel (PUSCH)/Physical UL Control Channel (PUCCH) together with Acks); explicit control signaling indicating how to choose among these options, where this signaling may be included together with the signaling that triggers transmission of one or both of the Ack types. In one example implementation, which should not be construed as limiting, if the resource allocations are on different component carriers, then choose a designated component carrier (e.g., the lower indexed one).

Additionally, bundling condition and/or rules 36 may include additional conditions that exclude sending the single transmission including both pre-timed and on-demand Acks. In one example, which should not be construed as limiting, bundling condition and/or rules 36 may dictate to follow the corresponding independent pre-timed Ack rules 20 or on-demand Ack rules 22, e.g., to send separate Ack transmissions (e.g., separate first Ack 28 and second Ack 30) instead of a single transmission, e.g., single, bundled Ack 32, when the resource allocations have incompatible characteristics, such as but not limited to different waveform types or transmit diversity types.

Figure 3:
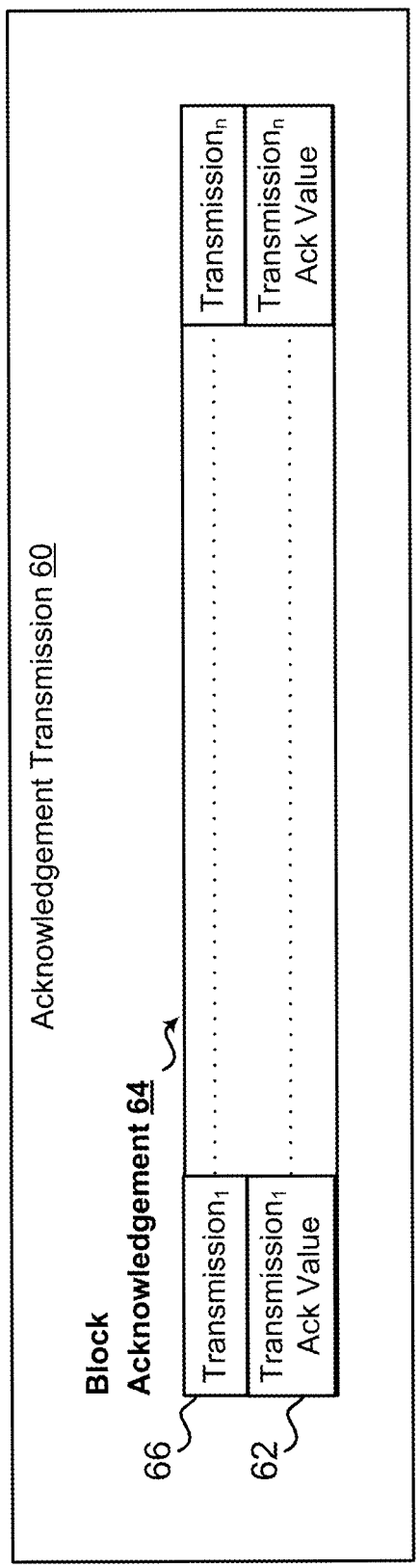
FIG. 3 is a schematic diagram of an example of a block Ack.

Referring to FIG. 3, in some cases, the pre-timed or on-demand Ack type 54 may respectively include a sub-type or an additional Ack type that indicates that a corresponding Ack transmission 60 may be a single transmission that includes all pending Acks, in the form of a transmission Ack value 62 for each transmission, such as for all pre-timed Acks or all on-demand Acks, or a combination of both. For example, a single transmission, such as Ack transmission 60, may include all of the respective Acks in a block-Ack 64. In some examples, the Ack transmission 60 may be associated with an Ack sub-type or an additional Ack type referred to as a block-Ack type (e.g., pre-timed block-Ack type or on-demand block-Ack type). For example, a respective block-Ack 64 may include a plurality of fields 66 for each transmission (e.g., transmission 1 to transmission n, where n is a positive integer) wherein each of the plurality of fields 66 includes a bit value. As shown by FIG. 3, each bit value may represent a corresponding transmission Ack value 62, e.g., an Ack, a Nack, or a null value corresponding to each currently pending Ack. This will be discussed in more detail below.

Referring back to FIG. 1, in the second case of dynamic determination of Ack type, first transmission 16 or second transmission 18 may be a control transmission that triggers Ack transmission, and may include Ack type indicator 34 to identify whether the Ack transmission should be pre-timed or on-demand. For example, but not to be construed as limiting, DL control information (DCI) on PDCCH that schedules a Physical DL Shared Channel (PDSCH) could include an Ack type indicator 34, e.g., a "k1" value, indicating a delay between receipt and Ack of PDSCH (thus, a pre-timed Ack). In some examples, the k1 value may be used as the variable to indicate delay between a grant received on PDCCH and the PDSCH that it schedules. Further, for example, a special k1 value could be used to indicate that the Ack is on-demand. For instance, in the case of the special k1 value, a subsequent DCI could include a demand indicator that triggers the transmission of the on-demand Ack and indicates the timing of a corresponding Ack. Alternatively, in another example that should not be construed as limiting, Ack type indicator 34 may include a special flag to indicates that, in addition to the pre-timed k1 value, the Ack should be re-sent at a later time as an on-demand Ack. That is, the special flag allows dynamic Ack repetition, which may provide robustness against loss of Acks, as Acks could be lost due to, for example, burst interference in shared-spectrum scenarios and/or puncturing by URLLC traffic. Additionally, the Ack type indicator 34 that indicates whether the Ack transmission is pre-timed or on-demand could be either explicit, e.g., in a DCI payload, or implicit, e.g., based on a time and frequency resource carrying the DCI, such as where the resource block for each time/frequency resource are indexed, and thus the index value indicates a certain result.

Further, in the second case of dynamic determination of Ack type, in some examples, an Ack transmission currently using pre-timed block-Acks may be dynamically requested to use one or more on-demand Acks. In this example a receiving entity may have multiple ways to handle how to respond to a received transmission. That is, in this case, the pre-timed block-Ack type may mean that a control transmission has reserved Ack bits in a field (e.g., field 66) of block-Ack 64 (see e.g., FIG. 3) that multiplexes Acks for multiple Ack transmissions. There are multiple options for how to handle the reserved Ack bits.

In one example, which should not be construed as limiting (and which could be applied to Acks of UL transmissions instead), communications component 26 of receiving entity 24, such as a UE, is configured to send block-Ack 64 including Acks for HARQ processes 1-8. As is typical for a pre-timed block-Ack, the whole block will be sent if the UE was previously scheduled on any one of these processes using an appropriately pre-timed Ack (or pre-timed block-Ack). However, if a most recent packet on, for example, HARQ process #4 was scheduled by a DCI indicating an on-demand Ack, then communications component 26 of receiving entity 24 may use one of Options 1-3 as follows:

Option 1: Receiving entity 24 may be configured to always send a Nack regardless of whether that packet was decoded, e.g., when the timing of transmitting the block-Ack is prior to a timing (if such timing is even known) of the on-demand Ack. In other words, because the Ack for the respective transmission (e.g., HARQ process #4) was not (or will not be) requested until a later time, also referred to as a deferred Ack, the block-Ack will include a Nack for that transmission. As such, the entity receiving the Nack knows to ignore the Nack for this "early" transmission, and looks for a subsequent transmission at the later time to include the Ack. Moreover, in option 1, if an Ack is received for an on-demand Ack type transmission in the block-Ack before the timing associated with the on-demand Ack type, then the entity receiving the Ack can determine that there is an error (e.g., an error in decoding, control signaling is not properly received, etc.) since an Ack was not supposed to have been received yet.

Option 2: Receiving entity 24 may be configured to send an Ack/Nack based on packet decoding. Even though Ack timing has not yet been revealed, option 2 may result in sending an early Ack. By sending an Ack or Nack for each outstanding process, e.g., in a block-Ack, then the receiving entity can clearly identify to which transmission (e.g., HARQ process) each Ack or Nack corresponds.

Option 3: Receiving entity 24 may be configured to not send either an Ack or a Nack. Option 3 can be used in a case where only a single transmission, e.g., HARQ process #4, needs an Ack. In other words, since no other transmissions have pre-timed Acks configured, then the entity receiving the Ack (who just switched the Ack type from pre-timed to on-demand) knows that it should not be receiving any Ack at this time, so no Ack or Nack needs to be sent (and, instead, the respective Ack or Nack can be sent at the later, on-demand time) by the receiving entity. In an example, the channel resource used by the receiving entity to transmit the Ack or Nack may then be reassigned for other purposes, for example, to other receiving entities. This option may be complicated, however, if multiple transmissions need an Ack, as the entity receiving the block-Ack may have difficulty understanding which transmissions correspond to which Ack or Nack. For example, in this case, the bits for Ack for HARQ process #4 may be removed from the block-Ack, and the remaining bits may be sent. However, if the DCI that schedules HARQ process #4 was missed by the receiving entity, e.g., a UE, then the UE would not remove those bits. So, the gNB receiver of Acks (in this example) has to decode assuming two different hypotheses of Ack block size. Errors due to the difficulty of option 3 may be reduced if the block-Ack includes its own cyclic redundancy check (CRC), which increases the likelihood of correct multiple hypothesis decoding.

Additionally, in the second case of dynamic determination of Ack type, when a transmission is dynamically requested to use an on-demand Ack, e.g., via Ack type indicator 34, then communications component 26 of receiving entity 24 may be configured with one of a plurality of different procedures for responding to a later received demand indication, e.g., Ack demand indicator 40 in subsequent transmission 38, that requests the on-demand Ack.

In some examples, the receipt of the Ack demand indicator 40 may essentially change the Ack type such that a corresponding Ack is a pre-timed Ack. In this case, a block-Ack type can be defined that carries Acks for all the transmissions (such as, but not limited to, all HARQ processes on a given component carrier) that could be acknowledged with on-demand Acks. Such a block-Ack may be treated similar to a block-Ack type for pre-timed Acks, e.g., taking a format the same as or similar to block-Ack 64. In any case, receipt of Ack demand indicator 40 triggers communications component 26 of receiving entity 24 to transmit this block-Ack. Alternatively, Ack demand indicator 40 could request Acks for only an indicated subset of these transmissions, resulting in a block-Ack that carries the corresponding Acks in the indicated subset.

In some implementations, Ack demand indicator 40 may also include a flag indicating that a corresponding Ack should be repeated at a later time as an on-demand Ack, which allows for dynamic Ack repetition.

In other implementations, the transmitted block-Ack 64 may include fields for acknowledging transmissions with no pending on-demand Acks. This allows the entity that received the block-Ack 64 for on-demand Acks to be able to easily identify which Ack or Nack corresponds to which transmission. For example, in this case, communications component 26 of receiving entity 24 may be configured to use one of the following options:

Option 1: The receiving entity 24 may generate a block-Ack 64 where the value of the fields corresponding to transmissions with no pending on-demand Acks may be set to Nack. For example, field values for corresponding transmissions with no pending on-demand Acks may have a bit value that represents a Nack.

Option 2: The receiving entity 24 may generate a block-Ack 64 where the value of the fields corresponding to transmissions with no pending on-demand Acks may be set to repeat the Ack/Nack bit value last sent for that entity (the most recent pre-timed Ack).

Additional features of the present aspects are described in more detail below with respect to FIGS. 4-8.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 4:
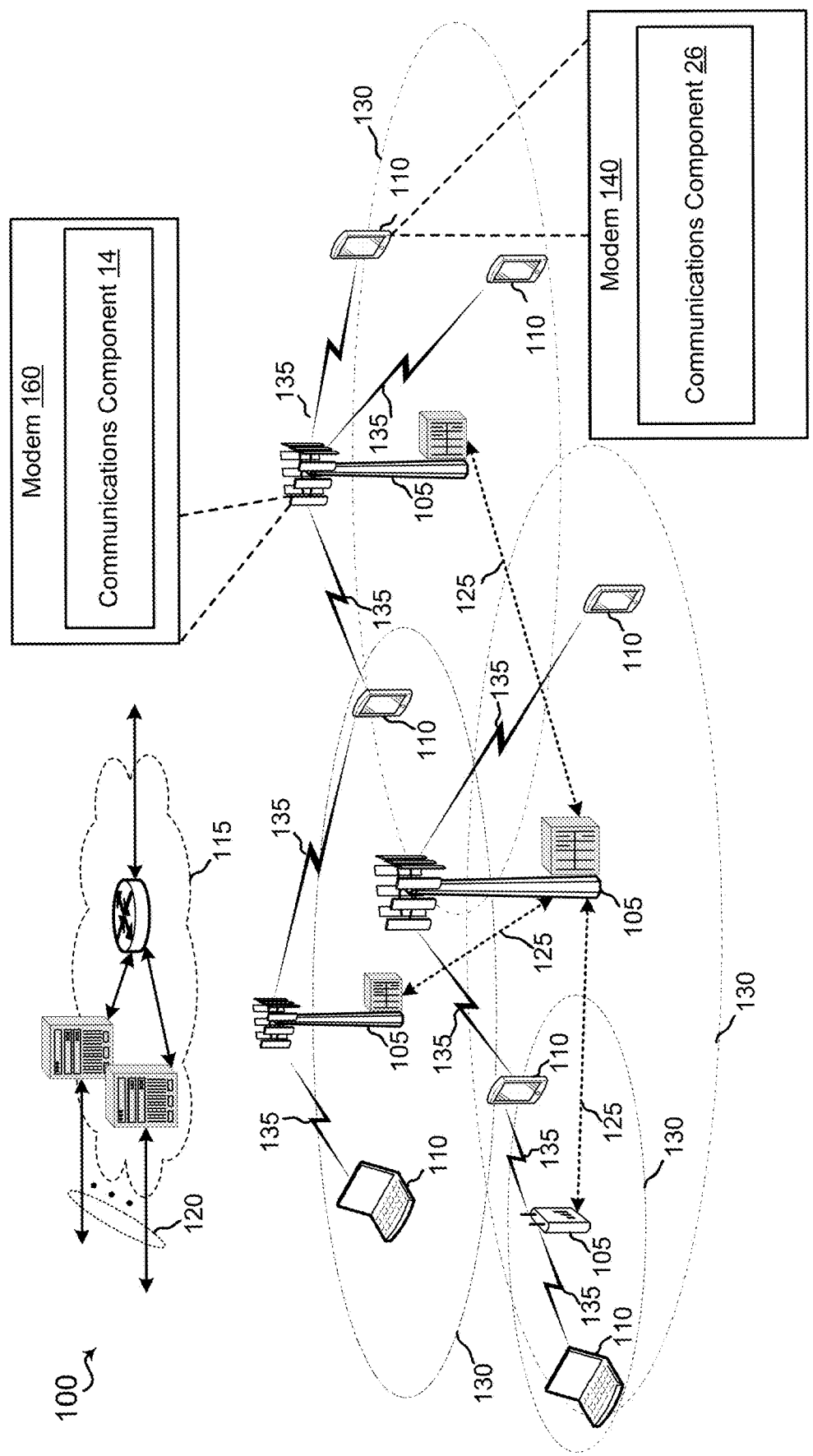
FIG. 4 is a schematic diagram of an example of a more detailed network environment in which the transmitting entity and receiving entity of FIG. 1 may operate.

Referring to FIG. 4, in accordance with one example implementation of various aspects of the present disclosure, example wireless communication network 100 includes at least one UE 110 with a modem 140 having communication component 26 that sends one or more transmissions that may require a pre-timed Ack or an on-demand Ack. Further, wireless communication network 100 includes at least one base station 105 with a modem 160 having communications component 14 that can receive the one or more transmissions and respond with an appropriate one or combination of the pre-timed Ack and/or the on-demand Ack. It is noted that in this example, UE 110 may be the same as or similar to receiving entity 24 of FIG. 1, and that base station 105 may be the same as or similar to transmitting entity 12 of FIG. 1. It should be understood that this is one example, and that in other examples UE 110 may be the same as or similar to transmitting entity 12 and base station 105 may be the same as or similar to receiving entity 24, or that each of UE 110 and base station 105 may both be configured to include the functionality of both transmitting entity 12 and receiving entity 24. As such, the aspects of the present disclosure may apply to acknowledging either or both of UL transmissions or DL transmissions.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry UL transmissions from a UE 110 to a base station 105, or DL transmissions, from a base station 105 to a UE 110. The DL transmissions may also be called forward link transmissions while the UL transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ MIMO techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple DL CCs and one or more UL CCs for CA. CA may be used with both FDD and TDD component carriers. The base stations 105 and UEs 110 may use spectrum up to Y MHz (e.g., Y=5, 10, 15, or 20 MHz) bandwidth per carrier allocated in a CA of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 5:
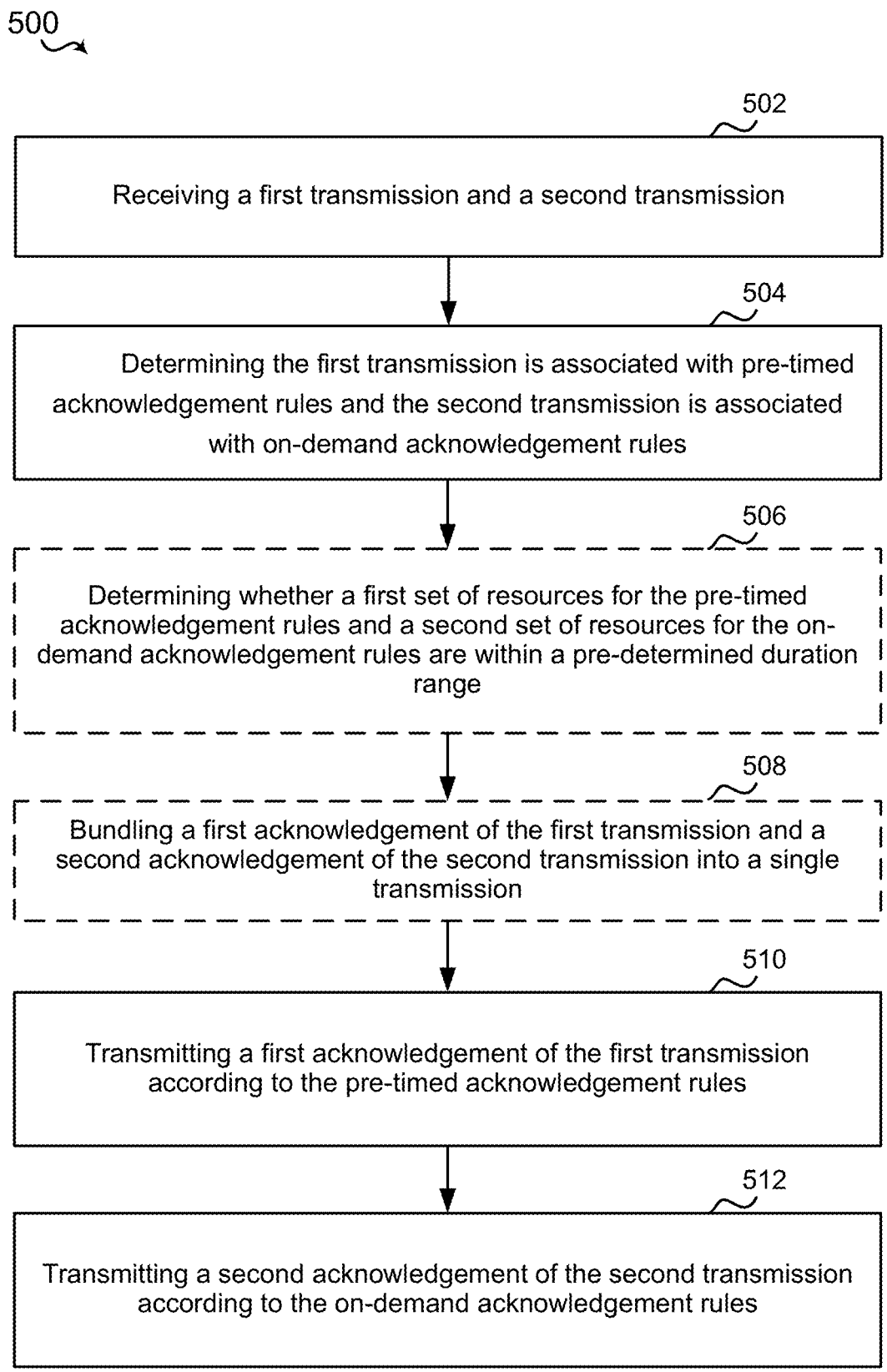
FIG. 5 is a flow diagram of an example of a method of wireless communication related to operation of receiving entity according to fixed partitioning of Ack types.

Referring to FIG. 5, an example method 500 of wireless communication in operating receiving entity 24 (FIG. 1) according to the above-described first case of fixed partitioning of Ack types includes one or more of the herein-defined actions.

At 502, method 500 includes receiving a first transmission and a second transmission. For instance, in an aspect, receiving entity 24 may execute communications component 26 to receive first transmission 16 and second transmission 18, as described herein. At 504, method 500 includes determining the first transmission is associated with pre-timed acknowledgement rules and determining the second transmission is associated with on-demand acknowledgement rules. For instance, in an aspect, receiving entity 24 may execute communications component 26 to determine the first transmission 16 is associated with pre-timed acknowledgement rules based on the first transmission 16 comprising control information or based on an Ack corresponding to the first transmission 16 requiring certain HARQ processes designated for pre-timed Acks, as described herein. In an aspect, receiving entity 24 may also execute communications component 26 to determine the second transmission 18 is associated with on-demand acknowledgement rules by determining that an Ack corresponding to the second transmission 18 should be transmitted on a heavily loaded carrier, transmitted on a shared-spectrum carrier, transmitted based on a carrier aggregation (CA) scenario with both licensed (i.e., dedicated) and shared-spectrum carriers, or transmitted according to certain HARQ processes designated for on-demand Acks, as described herein.

Optionally, at 506, method 500 includes determining whether a first set of resources for the pre-timed Ack rules and a second set of resources for the on-demand Ack rules are within a pre-determined duration range. For instance, in an aspect, receiving entity 24 may execute communications component 26 to determine whether a first set of resources for the pre-timed Ack rules 20 and a second set of resources for the on-demand Ack rules 22 are within a TTI range, as described herein. For example, pre-timed Ack rules 20 and on-demand Ack rules 22 may each include bundling conditions and/or rules 36 that allow bundling of a pre-timed Ack transmission with an on-demand Ack transmission, wherein the bundling conditions and/or rules 36 is based on whether a timing of the pre-timed Ack transmission and the on-demand Ack transmission are within a TTI range, e.g., within a same TTI, in overlapping TTIs, or respectively in near-in-time TTIs as defined by the TTI range.

Optionally, at 508, method 500 includes bundling a first Ack of the first transmission and a second Ack of the second transmission into a single transmission in response to the first set of resources for the pre-timed Ack requirement and the second set of resources for the on-demand Ack requirement being within the pre-determined duration range. For instance, in an aspect, receiving entity 24 may execute communications component 26 to bundle first Ack 28 of first transmission 16 and second Ack 30 of second transmission 18 into a single, bundled Ack transmission 32 in response to the first set of resources for the pre-timed Ack rules 20 and the second set of resources for the on-demand Ack rules 22 being within the transmission time interval range, as described herein.

At 510, method 500 includes transmitting a first Ack of the first transmission according to the pre-timed Ack rules. For instance, in an aspect, receiving entity 24 may execute communications component 26 to transmit first Ack 28 of first transmission 16 according to the pre-timed Ack rules 20, as described herein.

At 512, method 500 includes transmitting a second Ack of the second transmission according to the on-demand Ack rules. For instance, in an aspect, receiving entity 24 may execute communications component 26 to transmit second Ack 30 of second transmission 18 according to on-demand Ack rules 22, as described herein.

The Acks transmitted at 510 and 512 may be independent transmissions, or, as noted at optional block 508, a single, bundled Ack transmission 32 based on bundling condition and/or rules 36. For instance, the single, bundled Ack transmission 32 may include both pre-timed and on-demand Acks and may be transmitted on only a selected resource allocation, repeated on multiple resource allocations, or transmitted over a combined resource allocation (e.g., bundle both resource allocations into a single larger allocation). It should be appreciated that the steps identified above are not limited to a particular order and combination, but may be adapted for any combination.

Moreover, any of first Ack 28, second Ack 30, or bundled Ack 32 may include block-Ack 64 (FIG. 3) of a respective set of Ack types, or of a combination of Ack types, as described herein.

Figure 6:
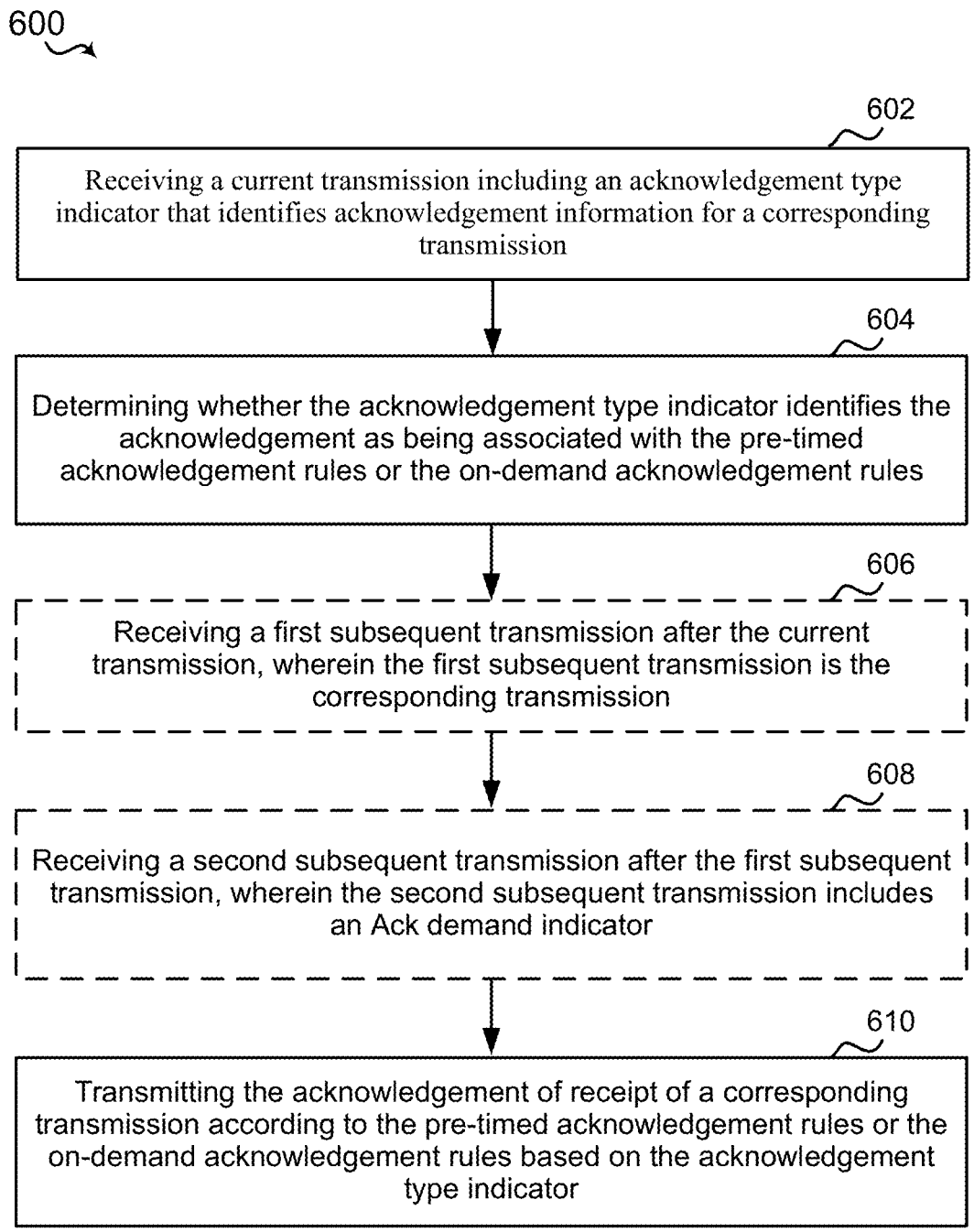
FIG. 6 is a flow diagram of an example of a method of wireless communication related to operation of receiving entity according to dynamic determination of Ack types.

Referring to FIG. 6, an example of a method 600 of wireless communication in operating receiving entity 24 (FIG. 1) according to the above-described second case of dynamic determination of Ack type includes one or more of the herein-defined actions.

At 602, method 600 includes receiving a current transmission including an Ack type indicator that identifies transmitting a corresponding Ack as being associated with either pre-timed Ack rules or on-demand Ack rules. For example, in an aspect, receiving entity 24 may execute communications component 26 to receive a current transmission, e.g., first transmission 16 or second transmission 18 or another transmission (not shown) prior to first transmission 16 or second transmission 18, including Ack type indicator 34 that identifies transmitting a corresponding Ack, e.g., first Ack 28 or second Ack 30, as being associated with either pre-timed Ack rules 20 or on-demand Ack rules 22, as described herein.

At 604, method 600 includes determining whether the Ack type indicator identifies the Ack as being associated with the pre-timed Ack rules or the on-demand Ack rules. For example, in an aspect, receiving entity 24 may execute communications component 26 to determine whether Ack type indicator 34 identifies the Ack as being associated with the pre-timed Ack rules 20 or the on-demand Ack rules 22, as described herein. For example, this determination may be based on a value, e.g., a k1 value, of Ack type indicator 34. As another example, Ack type indicator 34 may explicitly indicate the Ack type (e.g., in a DCI payload) or may implicitly indicate the Ack type (e.g., based on a time and frequency resource carrying the DCI, such as where the resource block for each time/frequency resource are indexed, and thus the index value indicates a certain result).

Optionally, at 606, method 600 includes receiving a first subsequent transmission after the current transmission, wherein the first subsequent transmission is the corresponding transmission. For example, in an aspect, receiving entity 24 may execute communications component 26 to receive a first subsequent transmission after the current transmission, wherein the first subsequent transmission is the corresponding transmission, as described herein. For instance, in the case where the current transmission is prior to first transmission 16 or second transmission 18, the first subsequent transmission in this case may be a data signal transmission, which could be first transmission 16 or second transmission 18.

Optionally, at 608, method 600 includes receiving a second subsequent transmission after the first subsequent transmission, wherein the second subsequent transmission includes an Ack demand indicator. For example, in an aspect, receiving entity 24 may execute communications component 26 to receive a second subsequent transmission after the first subsequent transmission, wherein the second subsequent transmission includes an Ack demand indicator, as described herein. For instance, in the case where the current transmission is prior to first transmission 16 or second transmission 18, and the first subsequent transmission is first transmission 16 or second transmission 18, then the second subsequent transmission may be subsequent transmission 38 that includes Ack demand indicator 38.

At 610, method 600 includes transmitting the Ack of receipt of a corresponding transmission according to the pre-timed Ack rules or the on-demand Ack rules based on the Ack type indicator. For example, in an aspect, receiving entity 24 may execute communications component 26 to transmit the Ack, e.g., first Ack 28 or second Ack 30, of receipt of a corresponding transmission, e.g., first transmission 16 or second transmission 18, according to the pre-timed Ack rules 20 or the on-demand Ack rules 22 based on the Ack type indicator 34, as described herein. Further, in an optional case relating to an on-demand Ack type, the transmitting at 610 may be in response to receiving subsequent transmission 38 including Ack demand indicator 40, as described herein. Moreover, the Ack at 610 may be any of first Ack 28, second Ack 30, or bundled Ack 32, and may include block-Ack 64 (FIG. 3) of a respective set of Ack types, or of a combination of Ack types, as described herein.

Figure 7:
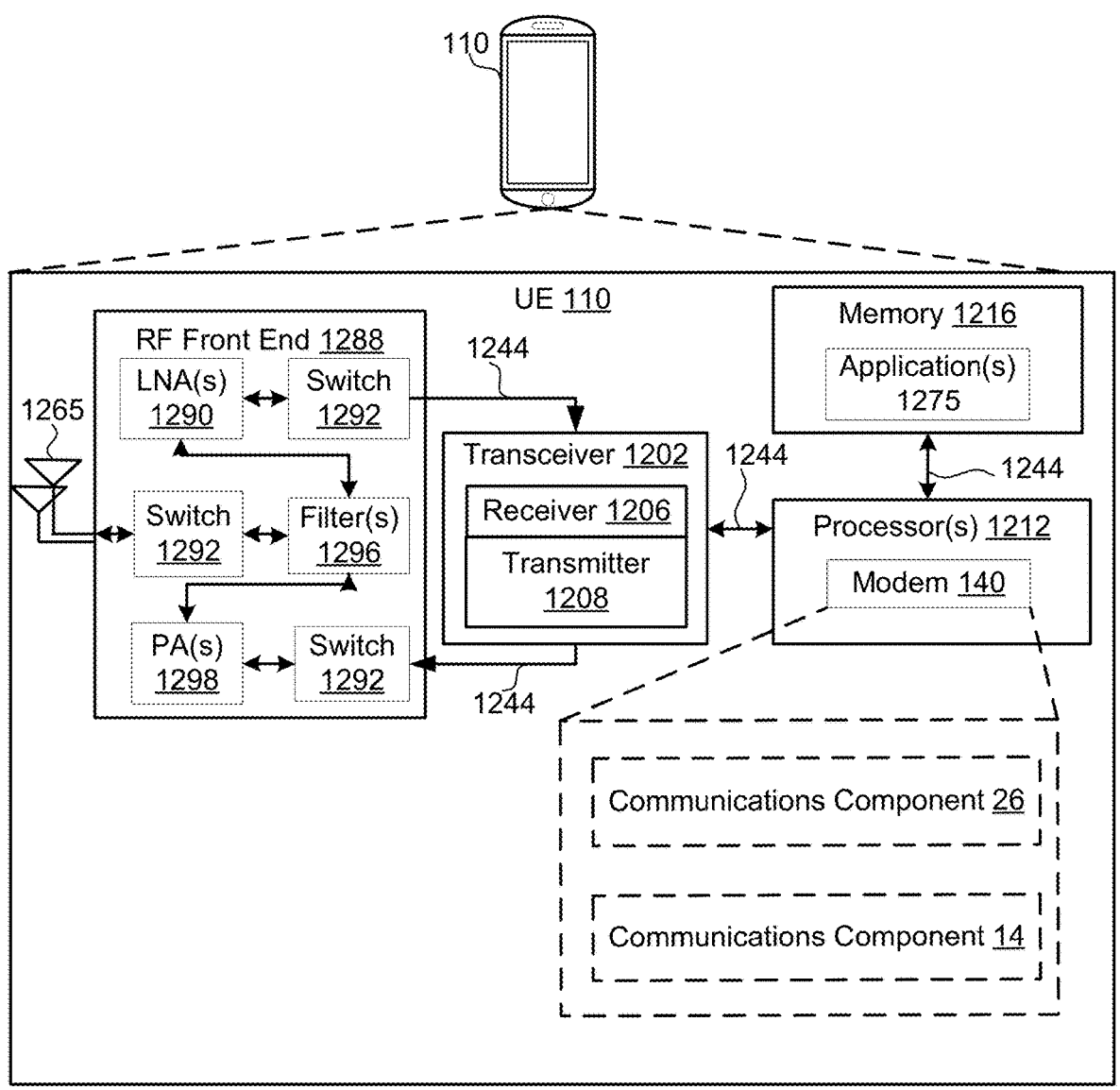
FIG. 7 is a schematic diagram of example components of the user equipment (UE) that may operate as the receiving entity or the transmitting entity of FIG. 1.

Referring to FIG. 7, one example of an implementation of UE 110 may include a variety of components, some of which have already been described above, but including components such as one or more processors 1212 and memory 1216 and transceiver 1202 in communication via one or more buses 1244, which may operate in conjunction with modem 140 and communications component 26 (when acting as receiving entity 24) and/or communications component 14 (when acting as transmitting entity 12) to enable one or more of the functions described herein related to allowing receiving entity 24 to transmit a mixture of pre-timed and on-demand Acks. Further, the one or more processors 1212, modem 1214, memory 1216, transceiver 1202, RF front end 288 and one or more antennas 286, may be configured to support voice and/or data calls (simultaneously or non-simultaneously) in one or more radio access technologies.

In an aspect, the one or more processors 1212 can include a modem 140 that uses one or more modem processors. The various functions related to communications component 26 (when acting as receiving entity 24) and/or communications component 14 (when acting as transmitting entity 12) may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 associated with communications component 26 (when acting as receiving entity 24) and/or communications component 14 (when acting as transmitting entity 12) may be performed by transceiver 1202.

Also, memory 1216 may be configured to store data used herein and/or local versions of applications 1275 or communications component 26 (when acting as receiving entity 24) and/or communications component 14 (when acting as transmitting entity 12) and/or one or more of their subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining communications component 26 (when acting as receiving entity 24) and/or communications component 14 (when acting as transmitting entity 12) and/or one or more of their subcomponents, and/or data associated therewith, when UE 110 is operating at least one processor 1212 to execute communications component 26 (when acting as receiving entity 24) and/or communications component 14 (when acting as transmitting entity 12) and/or one or more of their subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, an RF receiver. In an aspect, receiver 1206 may receive signals transmitted by at least one base station 125. Additionally, receiver 1206 may process such received signals, and also may obtain measurements of the signals, such as, but not limited to, energy per chip to interference power ratio (Ec/Io), signal-to-noise ratio (SNR), reference signal received power (RSRP), received signal strength indicator (RSSI), etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 110 may include RF front end 1288, which may operate in communication with one or more antennas 1265 and transceiver 1202 for receiving and transmitting radio transmissions, for example, wireless communications transmitted by at least one base station 125 or wireless transmissions transmitted by UE 110. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 1202 to operate at a specified frequency and power level based on the UE configuration of the UE 110 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 8:
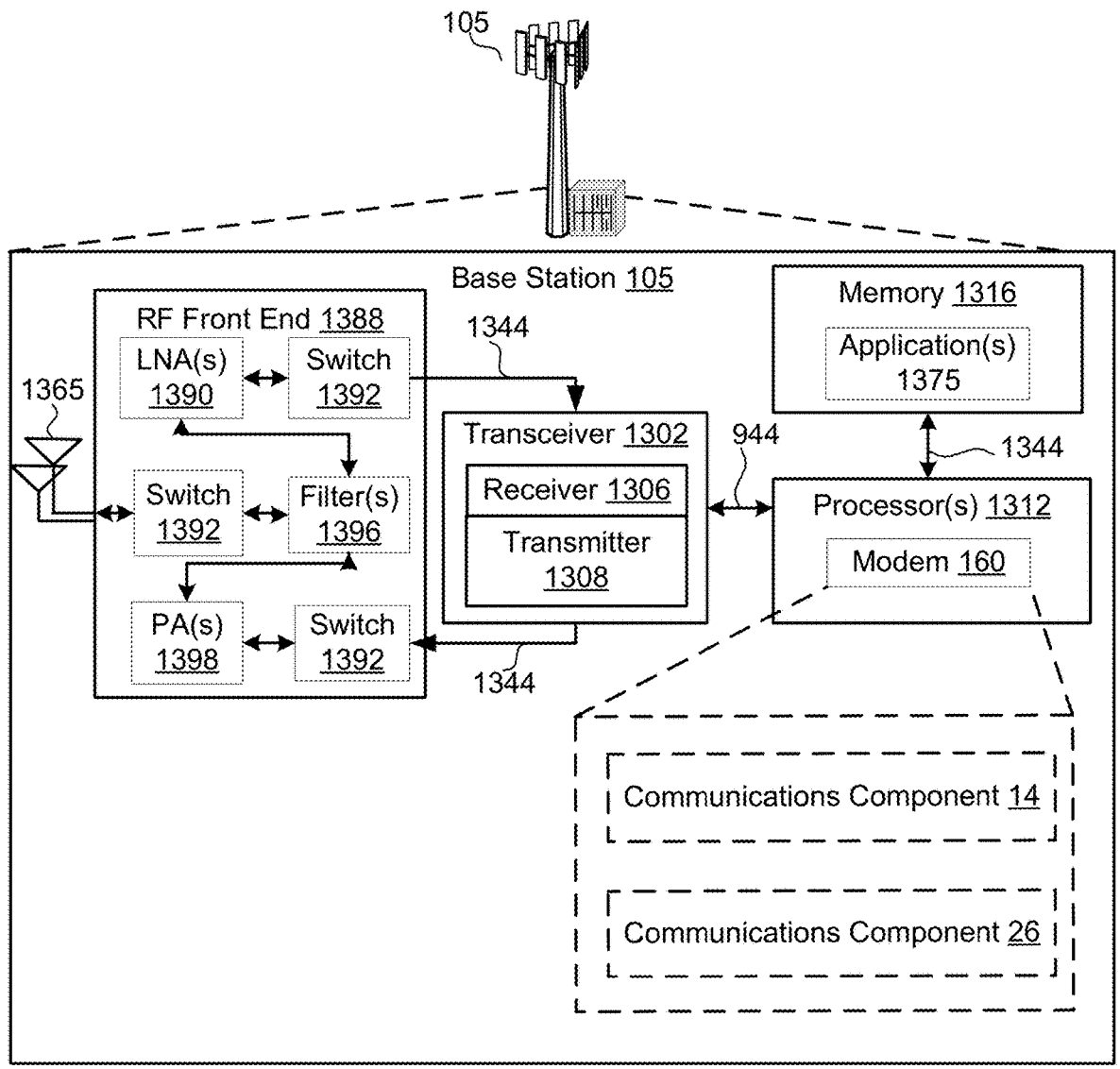
FIG. 8 is a schematic diagram of example components of the base station that may operate as the receiving entity or the transmitting entity of FIG. 1.

Referring to FIG. 8, one example of an implementation of base station 105 may include a variety of components, some of which have already been described above, but including components such as one or more processors 1312 and memory 1316 and transceiver 1302 in communication via one or more buses 1344, which may operate in conjunction with modem 160 and communications component 26 (when acting as receiving entity 24) and/or communications component 14 (when acting as transmitting entity 12) to enable one or more of the functions described herein related to allowing receiving entity 24 to transmit a mixture of pre-timed and on-demand Acks.

The transceiver 1302, receiver 1306, transmitter 1308, one or more processors 1312, memory 1316, applications 1075, buses 1344, RF front end 1388, LNAs 1390, switches 1392, filters 1396, PAs 1398, and one or more antennas 1365 may be the same as or similar to the corresponding components of UE 110, as described above, but configured or otherwise programmed for base station operations as opposed to UE operations.

In a configuration, an apparatus (e.g., UE 110 or base station 105) for wireless communication may include one or more means for receiving a first transmission and a second transmission, means for determining the first transmission is associated with pre-timed acknowledgement rules, means for determining the second transmission is associated with on-demand acknowledgement rules, means for transmitting a first acknowledgement of the first transmission according to the pre-timed acknowledgement rules, or means for transmitting a second acknowledgement of the second transmission according to the on-demand acknowledgement rules.

In some examples of the configuration, the apparatus may also include one or more means for determining whether a first set of resources for the pre-timed acknowledgement rules and a second set of resources for the on-demand acknowledgement rules are within the pre-determined duration range, means for bundling the first acknowledgement of the first transmission and the second acknowledgement of the second transmission into a single transmission in response to the first set of resources for the pre-timed acknowledgement rules and the second set of resources for the on-demand acknowledgement rules being within the pre-determined duration range.

In another configuration, the apparatus (e.g., UE 110 or base station 105) for wireless communication may include one or more means for receiving a current transmission including an acknowledgement type indicator that identifies acknowledgement information for a corresponding transmission, means for determining whether the acknowledgement type indicator identifies the acknowledgement information as being associated with pre-timed acknowledgement rules or on-demand acknowledgement rules, or means for transmitting an acknowledgement of the corresponding transmission according to the pre-timed acknowledgement rules or the on-demand acknowledgement rules based on the acknowledgement type indicator.

In some examples of the other configuration, the apparatus may also include one or more means for receiving a first subsequent transmission after the current transmission, wherein the first subsequent transmission is the corresponding transmission, or means for receiving a second subsequent transmission after the first subsequent transmission, wherein the second subsequent transmission includes an acknowledgement demand indicator.

The aforementioned means may be one or more of the aforementioned components of the UE 110 or base station 105 as described above, where the components are configured to perform the functions recited by the aforementioned means. For example, the aforementioned means may be the processor(s) 1212 or the processor(s) 1312 configured to perform the functions recited by the aforementioned means.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
    receiving a first transmission and a second transmission;
    determining the first transmission is associated with pre-timed acknowledgement rules;
    determining the second transmission is associated with on-demand acknowledgement rules;
    transmitting a first acknowledgement of the first transmission according to the pre-timed acknowledgement rules; and
    transmitting a second acknowledgement of the second transmission according to the on-demand acknowledgement rules,
    wherein the pre-timed acknowledgement rules and the on-demand acknowledgement rules each include a bundling condition that allow bundling of a pre-timed acknowledgement transmission with an on-demand acknowledgement transmission.

2. The method of claim 1, wherein the pre-timed acknowledgement rules and the on-demand acknowledgement rules are each pre-specified by specification rules or pre-configured semi-statically by radio resource control signaling.

3. The method of claim 1, wherein the bundling condition is whether a timing of the pre-timed acknowledgement transmission and the on-demand acknowledgement transmission are within a pre-determined duration range.

4. The method of claim 3, further comprising:
    determining whether a first set of resources for the pre-timed acknowledgement rules and a second set of resources for the on-demand acknowledgement rules are within the pre-determined duration range; and
    bundling the first acknowledgement of the first transmission and the second acknowledgement of the second transmission into a single transmission in response to the first set of resources for the pre-timed acknowledgement rules and the second set of resources for the on-demand acknowledgement rules being within the pre-determined duration range.

5. The method of claim 1, wherein one or more of the first acknowledgement or the second acknowledgement is transmitted in a block acknowledgement.

6. An apparatus for wireless communication, comprising:
    a memory including instructions; and
    at least one processor communicatively coupled with the memory and configured to:
        receive a first transmission and a second transmission;
        determine the first transmission is associated with pre-timed acknowledgement rules;
        determine the second transmission is associated with on-demand acknowledgement rules;
        transmit a first acknowledgement of the first transmission according to the pre-timed acknowledgement rules; and
        transmit a second acknowledgement of the second transmission according to the on-demand acknowledgement rules,
    wherein the pre-timed acknowledgement rules and the on-demand acknowledgement rules each include a bundling condition that allow bundling of a pre-timed acknowledgement transmission with an on-demand acknowledgement transmission.

7. The apparatus of claim 6, wherein the pre-timed acknowledgement rules and the on-demand acknowledgement rules are each pre-specified by specification rules or pre-configured semi-statically by radio resource control signaling.

8. The apparatus of claim 6, wherein the bundling condition is whether a timing of the pre-timed acknowledgement transmission and the on-demand acknowledgement transmission are within a pre-determined duration range.

9. The apparatus of claim 8, wherein the at least one processor is further configured to:
    determine whether a first set of resources for the pre-timed acknowledgement rules and a second set of resources for the on-demand acknowledgement rules are within the pre-determined duration range; and
    bundle the first acknowledgement of the first transmission and the second acknowledgement of the second transmission into a single transmission in response to the first set of resources for the pre-timed acknowledgement rules and the second set of resources for the on-demand acknowledgement rules being within the pre-determined duration range.

10. The apparatus of claim 6, wherein one or more of the first acknowledgement or the second acknowledgement is transmitted in a block acknowledgement.

11. A non-transitory computer-readable medium storing computer executable code, comprising code to:
    receive a first transmission and a second transmission;
    determine the first transmission is associated with pre-timed acknowledgement rules;
    determine the second transmission is associated with on-demand acknowledgement rules;
    transmit a first acknowledgement of the first transmission according to the pre-timed acknowledgement rules; and
    transmit a second acknowledgement of the second transmission according to the on-demand acknowledgement rules,
    wherein the pre-timed acknowledgement rules and the on-demand acknowledgement rules each include a bundling condition that allow bundling of a pre-timed acknowledgement transmission with an on-demand acknowledgement transmission.

12. The non-transitory computer-readable medium of claim 11, wherein the pre-timed acknowledgement rules and the on-demand acknowledgement rules are each pre-specified by specification rules or pre-configured semi-statically by radio resource control signaling.

13. The non-transitory computer-readable medium of claim 11, wherein the bundling condition is whether a timing of the pre-timed acknowledgement transmission and the on-demand acknowledgement transmission are within a pre-determined duration range.

14. The non-transitory computer-readable medium of claim 13, further comprising code to:
    determine whether a first set of resources for the pre-timed acknowledgement rules and a second set of resources for the on-demand acknowledgement rules are within the pre-determined duration range; and bundle the first acknowledgement of the first transmission and the second acknowledgement of the second transmission into a single transmission in response to the first set of resources for the pre-timed acknowledgement rules and the second set of resources for the on-demand acknowledgement rules being within the pre-determined duration range.

15. The non-transitory computer-readable medium of claim 11, wherein one or more of the first acknowledgement or the second acknowledgement is transmitted in a block acknowledgement.

16. An apparatus for wireless communication, comprising:

means for receiving a first transmission and a second transmission;

means for determining the first transmission is associated with pre-timed acknowledgement rules;

means for determining the second transmission is associated with on-demand acknowledgement rules;

means for transmitting a first acknowledgement of the first transmission according to the pre-timed acknowledgement rules; and means for transmitting a second acknowledgement of the second transmission according to the on-demand acknowledgement rules, wherein the pre-timed acknowledgement rules and the on-demand acknowledgement rules each include a bundling condition that allow bundling of a pre-timed acknowledgement transmission with an on-demand acknowledgement transmission.

17. The apparatus of claim 16, wherein the pre-timed acknowledgement rules and the on-demand acknowledgement rules are each pre-specified by specification rules or pre-configured semi-statically by radio resource control signaling.

18. The apparatus of claim 16, wherein the bundling condition is whether a timing of the pre-timed acknowledgement transmission and the on-demand acknowledgement transmission are within a pre-determined duration range.

19. The apparatus of claim 18, further comprising:

means for determining whether a first set of resources for the pre-timed acknowledgement rules and a second set of resources for the on-demand acknowledgement rules are within the pre-determined duration range; and means for bundling the first acknowledgement of the first transmission and the second acknowledgement of the second transmission into a single transmission in response to the first set of resources for the pre-timed acknowledgement rules and the second set of resources for the on-demand acknowledgement rules being within the pre-determined duration range.

20. The apparatus of claim 16, wherein one or more of the first acknowledgement or the second acknowledgement is transmitted in a block acknowledgement.

\* \* \* \* \*